(12) United States Patent
Gordon et al.

(10) Patent No.: US 8,116,374 B2
(45) Date of Patent: Feb. 14, 2012

(54) METHOD AND SYSTEM FOR GENERATING A TRANSFORM SIZE SYNTAX ELEMENT FOR VIDEO DECODING

(75) Inventors: Stephen Gordon, North Andover, MA (US); Douglas Chin, Haverhill, MA (US)

(73) Assignee: Broadcom Corporation, Irvine, CA (US)

( * ) Notice: Subject to any disclaimer, the term of this patent is extended or adjusted under 35 U.S.C. 154(b) by 1450 days.

(21) Appl. No.: 11/119,615

(22) Filed: May 2, 2005

(65) Prior Publication Data

US 2005/0249291 A1    Nov. 10, 2005

Related U.S. Application Data

(60) Provisional application No. 60/568,926, filed on May 7, 2004, provisional application No. 60/569,176, filed on May 7, 2004.

(51) Int. Cl.
*H04N 7/12* (2006.01)

(52) U.S. Cl. .................................. 375/240.12

(58) Field of Classification Search ............... 375/240.12
See application file for complete search history.

(56) References Cited

U.S. PATENT DOCUMENTS

| | | | |
|---|---|---|---|
| 5,054,103 A | 10/1991 | Yasuda et al. | |
| 5,878,169 A | 3/1999 | Miyamoto | |
| 5,883,673 A | 3/1999 | Miyamoto | |
| 5,909,252 A | 6/1999 | Ueda et al. | |
| 5,959,675 A | 9/1999 | Mita et al. | |
| 5,999,655 A | 12/1999 | Kalker et al. | |
| 6,014,173 A | 1/2000 | Miyamoto | |
| 6,160,848 A | 12/2000 | Sivan | |
| 6,263,110 B1 | 7/2001 | Andrew et al. | |
| 6,347,157 B2 | 2/2002 | Chui | |
| 6,370,197 B1 | 4/2002 | Clark et al. | |
| RE37,858 E | 9/2002 | Murakami et al. | |
| 6,603,814 B2 | 8/2003 | Clark et al. | |
| 2001/0017942 A1 | 8/2001 | Kalevo et al. | |
| 2002/0146073 A1 | 10/2002 | Clark et al. | |
| 2003/0128885 A1 | 7/2003 | Zhou | |
| 2003/0156648 A1 | 8/2003 | Holcomb et al. | |
| 2003/0202705 A1 | 10/2003 | Sun | |
| 2005/0025246 A1* | 2/2005 | Holcomb ................. | 375/240.23 |

OTHER PUBLICATIONS

M. Wien, "Variable Block-Size Transforms for H.264/AVC," IEEE Trans. on Cir. and Sys. for Video Technology, vol. 13, No. 7, pp. 604-613, Jul. 2003.*

(Continued)

*Primary Examiner* — Jayanti K Patel
*Assistant Examiner* — Richard Torrente
(74) *Attorney, Agent, or Firm* — Thomas, Kayden, Horstemeyer & Risley LLP.

(57) ABSTRACT

In a video processing system, a method and system for generating a transform size syntax element for video decoding are provided. For high profile mode video decoding operations, the transform sizes may be selected based on the prediction macroblock type and the contents of the macroblock. A set of rules may be utilized to select from a 4×4 or an 8×8 transform size during the encoding operation. Dynamic selection of transform size may be performed on intra-predicted macroblocks, inter-predicted macroblocks, and/or direct mode inter-predicted macroblocks. The encoding operation may generate a transform size syntax element to indicate the transform size that may be used in reconstructing the encoded macroblock. The transform size syntax element may be transmitted to a decoder as part of the encoded video information bit stream.

15 Claims, 8 Drawing Sheets

OTHER PUBLICATIONS

Steve Gordon, Detlev Marpe, Thomas Wiegand, *Simplified Use of 8x8 Transforms—Updated Proposal & Results,* Joint Video Team (JVT) of ISO/IEC MPEG & ITU-T VCEG (ISO/IEC JTC1/SC29/WG11 and ITU-T SG16 Q.6), 11$^{th}$ Meeting: Munich, Germany, Mar. 15-19, 2004, pp. 1-17, Document: JVT-K028.

Steve Gordon, Detlev Marpe, Thomas Wiegand, *Simplified Use of 8x8 Transforms—Proposal,* Joint Video Team (JVT) of ISO/IEC MPEG & ITU-T VCEG (ISO/IEC JTC1/SC29/WG11 and ITU-T SG16 Q.6), 10th Meeting: Waikoloa, Hawaii, USA, Dec. 8-12, 2003, pp. 1-12, Document: JVT-J029.

Steve Gordon, *Simplified Use of 8x8 Transforms,* Joint Video Team (JVT) of ISO/IEC MPEG & ITU-T VCEG (ISO/IEC JTC1/SC29/WG11 and ITU-T SG16 Q.6), 9th Meeting: San Diego, California, USA, Sep. 2-5, 2003, pp. 1-28, Document: JVT-I022.

Steve Gordon, *ABT for Film Grain Reproduction in High Definition Sequences,* Joint Video Team (JVT) of ISO/IEC MPEG & ITU-T VCEG (ISO/IEC JTC1/SC29/WG11 and ITU-T SG16 Q.6), 8$^{th}$ Meeting: Geneva, Switzerland, May 23-27, 2003, pp. 1-16, Document: JVT-H029.

Mathias Wien, Achim Dahlhoff, *16 Bit Adaptive Block Size Transforms,* Joint Video Team (JVT) of ISO/IEC MPEG & ITU-T VCEG (ISO/IEC JTC1/SC29/WG11 and ITU-T SG16 Q.6), 3$^{rd}$ Meeting: Fairfax, Virginia, USA, May 6-10, 2002, pp. 1-54, Document: JVT-C107r1.

\* cited by examiner

METHOD AND SYSTEM FOR GENERATING A TRANSFORM SIZE SYNTAX ELEMENT FOR VIDEO DECODING

CROSS-REFERENCE TO RELATED APPLICATIONS/INCORPORATION BY REFERENCE

This patent application makes reference to, claims priority to and claims benefit from U.S. Provisional Patent Application Ser. No. 60/568,926, filed on May 7, 2004 and from U.S. Provisional Patent Application Ser. No. 60/569,176, filed on May 7, 2004.

This application makes reference to U.S. patent application Ser. No. 11/107,138 filed on Apr. 15, 2005.

The above stated applications are hereby incorporated herein by reference in their entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to the processing of video signals. More specifically, certain embodiments of the invention relate to a method and system for generating a transform size syntax element for video decoding.

BACKGROUND OF THE INVENTION

The introduction of advanced video applications such as digital television, high-definition television, and internet-based video has prompted the need for standardizing compression technologies for use in television broadcast and home entertainment systems. For example, the International Standards Organization's (ISO) Motion Picture Experts Group (MPEG) developed the MPEG4 compression standard to support internet-based video applications. In another example, the Video Coding Experts Group (VCEG) of the International Telecommunication Union's Telecommunication Standardization Sector (ITU-T) developed the ITU-T H.263 compression standard to support videoconferencing applications. These and other video coding standards are being developed to enable wide utilization of new video technologies in commercial and personal settings. In 2001, the Joint Video Team (JVT) was formed to develop a full international standard that offered significantly better video compression efficiency for low bit-rate visual communication systems. To achieve its goal, the JVT brought together experts from ISO MPEG and from ITU-T VCEG. The proposed outcome of this joint effort was to result in two separate but technically consistent standard specifications: the ISO MPEG4 Part 10 and the ITU-T H.264.

The H.264 coding standard provides flexibility by defining a baseline profile, a main profile, and an extended profile in order to serve a variety of applications. The main profile, for example, is intended to support digital television broadcasting and next-generation digital versatile disk (DVD) applications. The baseline profile, for example, is intended to support mobile applications that may have limited processing capabilities. The extended profile, for example, is intended to support streaming video and may comprise features that provide error resilience and that facilitate switching between bitstreams.

Enhancements to the H.264 coding standard have resulted from a new set of coding tools known as the fidelity range extensions (FRExt). The FRExt extensions, for example, are intended to support high image resolutions needed in applications such as studio video editing, post-production processing, standard definition (SD) and high-definition (HD) television, and enhanced DVD video. The FRExt extensions also define a high profile, which may be utilized to provide higher coding efficiency without adding significant implementation complexity. In this regard, the high profile may be adapted by applications such as those supported by the Blu-ray Disk Association, the digital video broadcast (DVB) standards, the HD-DVD specification of the DVD Forum, and/or the new broadcast TV specification of the US advanced television systems committee (ATSC).

In the profiles defined by the H.264 coding standard, coding or compression of image and/or video signals may be accomplished by first transforming the signal, or an error that may result from predicting the signal, from a spatial domain representation to a spatial frequency domain representation. For example, image and/or video signal compression may be achieved by means of a two dimensional (2D) Discrete Cosine Transform (DCT). Another transformation approach may be to adaptively change the basis functions in a 2D transform based on signal content. In this latter approach, for example, the 2D transform may be based on wavelets. Following the transformation operation, a quantization step may be utilized to zero-out any coefficients with relatively low values. The transformation and quantization steps may reduce redundancies in the signal's spatial content by compacting the signal's energy to as few basis functions as possible. By increasing the size of the transform, a corresponding increase in signal energy compaction may be achieved thereby improving the performance of the entire compression system.

However, increasing the transform size in order to achieve the type of low bit-rate system envisioned by the JVT may result in compression artifacts that may be clearly visible upon displaying the signal after decompression or decoding. These artifacts may be particularly noticeable in areas of sharp transitions such as high contrast edges in image and video signals. In certain applications, such as those supported by the high profile for example, other approaches may be necessary to achieve lower bit-rates, that is, to provide higher coding efficiency, without producing compression artifacts that may result when large transform sizes are utilized in portions of the image and/or video signals that exhibit sharp or abrupt transitions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for generating a transform size syntax element for video decoding, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for generating a transform size syntax element for video decoding. By implementing a set of simplified transform selection rules and guidelines in the encoding and decoding processes of image and video signals, it may be possible to achieve the low bit-rate objective of ISO MPEG4 Part 10 and ITU-T H.264 while minimizing the effects of compression artifacts in signals with regions of sharp or abrupt transitions. These selection rules and guidelines may achieve this objective by combining the benefits of reduced residual correlation through better signal prediction selection with the benefits of large transform sizes in areas without high detail and/or sharp transitions. In addition to providing improved compression efficiency by transform selection based on image content and prediction block size, the use of simple selection rules may reduce the amount of side information that may transferred to a decoder to reconstruct the image. Note that the following discussion may generally use the terms "video," "image," and "picture" interchangeably. Accordingly, the scope of various aspects of the present invention should not be limited by notions of difference between the terms "video," "image," and "picture."

Figure 1:
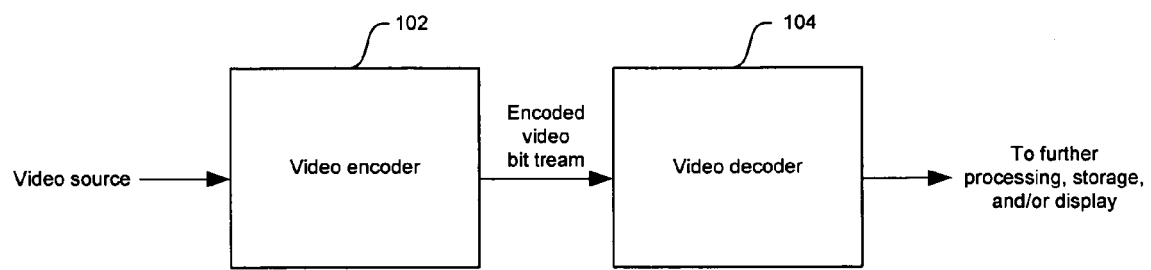
FIG. 1 is a block diagram illustrating an exemplary encoder and decoder system, in connection with an embodiment of the invention.

FIG. 1 is a block diagram illustrating an exemplary encoder and decoder system, in connection with an embodiment of the invention. Referring to FIG. 1, there is shown a video encoder 102 and a video decoder 104. The video encoder 102 may comprise suitable logic, circuitry, and/or code that may be adapted to encode or compress video information from a video source and generate an encoded video bit stream that comprises the encoded or compressed video information. The generated encoded video bit stream may also comprise side information regarding the encoding or compression operations in the video encoder 102. The generated encoded video bit stream may be transferred to the video decoder 104. The video encoder 102 may be adapted to support, for example, the ISO MPEG4 Part 10 and the ITU-T H.264 standard specifications. Moreover, the video encoder 102 may be adapted to support, for example, fidelity range extensions (FRExt) and a high profile mode of operation associated with the H.264 standard specification.

The video decoder 104 may comprise suitable logic, circuitry, and/or code that may be adapted to decode or decompress the encoded video bit stream generated by the video encoder 102 and generate a video signal that may be transferred to other processing devices, to storage devices, and/or to display devices. The video decoder 104 may be adapted to support, for example, the ISO MPEG4 Part 10 and the ITU-T H.264 standard specifications. Moreover, the video decoder 104 may be adapted to support, for example, fidelity range extensions (FRExt) and a high profile mode of operation associated with the H.264 standard specification.

When encoding a current picture in the video encoder 102, the current picture may be processed in units of a macroblock, where a macroblock corresponds to, for example, 16×16 pixels in the original image. A macroblock may be encoded in intra-coded mode, for "I" pictures, or in inter-coded mode, for predictive or "P" pictures and bidirectional or "B" pictures. The intra-coded or "I" pictures may only use the information within the picture to perform video compression. In the H.264 standard, for example, the "I" pictures may utilize spatial prediction to reduce redundancy. These self-contained "I" pictures provide a base value or anchor frame that is an estimate of the value of succeeding pictures. Each GOP may generally start with a self-contained "I" picture as the reference or anchor frame from which the other pictures in the group may be generated for display. The GOP frequency, and correspondingly the frequency of "I" pictures, may be driven by specific application spaces. The predicted or "P" pictures may use a motion estimation scheme to generate picture elements that may be predicted from the most recent anchor frame or "I" picture. Compressing the difference between predicted samples and the source value results in better coding efficiency than that which may be achieved by transmitting the encoded version of the source picture information. At the video decoder 104, the compressed difference picture is decoded and subsequently added to a predicted picture for display.

Motion estimation may refer to a process by which an encoder estimates the amount of motion for a collection of picture samples in a picture "P", via displacing another set of picture samples within another picture. Both sets of picture samples may have the same coordinates within their corresponding pictures and the displacing may be performed within a larger group of picture samples labeled a motion window. Minimizing the difference between the two sets of picture samples motivates motion estimation. A displaced set of picture samples corresponding to a minimum difference may be considered the best prediction and may be distinguished by a set of motion vectors. Once all the motion vectors are available, the whole picture may be predicted and subtracted from the samples of the "P" picture. The resulting difference signal may then be encoded by the video encoder 102.

Motion compensation may refer to a process by which a decoder recalls a set of motion vectors and displaces the corresponding set of picture samples. Output samples may be decoded or reconstructed by adding the displaced samples to a decoded difference picture. Because it may be desirable to produce a drift-free output stream, both the encoder and the decoder need access to the same decoded pictures in order to utilize the decoded pictures as basis for estimation of other pictures. For this purpose, the encoder may comprise a copy of the decoder architecture to enable the duplication of reconstructed pictures. As a result, the final motion estimation and final displacement may be done on reconstructed pictures.

Since both the "I" pictures and the "P" pictures may be used to predict pixels, they may be referred to as "reference" pictures. The bidirectional-predicted pictures or "B" pictures may use multiple pictures that occur in a future location in the video sequence and/or in a past location in the video sequence to predict the image samples. As with "P" pictures, motion estimation may be used for pixel prediction in "B" pictures and the difference between the original source and the predicted picture may be compressed by the video encoder 102. At the video decoder 104, one or more "B" pictures may be motion compensated and may be added to the decoded version of the compressed difference signal for display.

In H.264-based applications, slices or portions of a picture or image may comprise macroblocks that are intra-coded or inter-coded. In this regard, an "I" slice comprises intra-coded macroblocks, a "P" slice comprises predicted inter-coded macroblocks, and a "B" slice comprises bi-directionally predicted inter-coded macroblocks. Inter-coded macroblocks in "P" slices may only use one vector to predict a block of pixels. Inter-coded macroblocks in "B" slices may use one or two vectors to predict a block of pixels.

Figure 2:
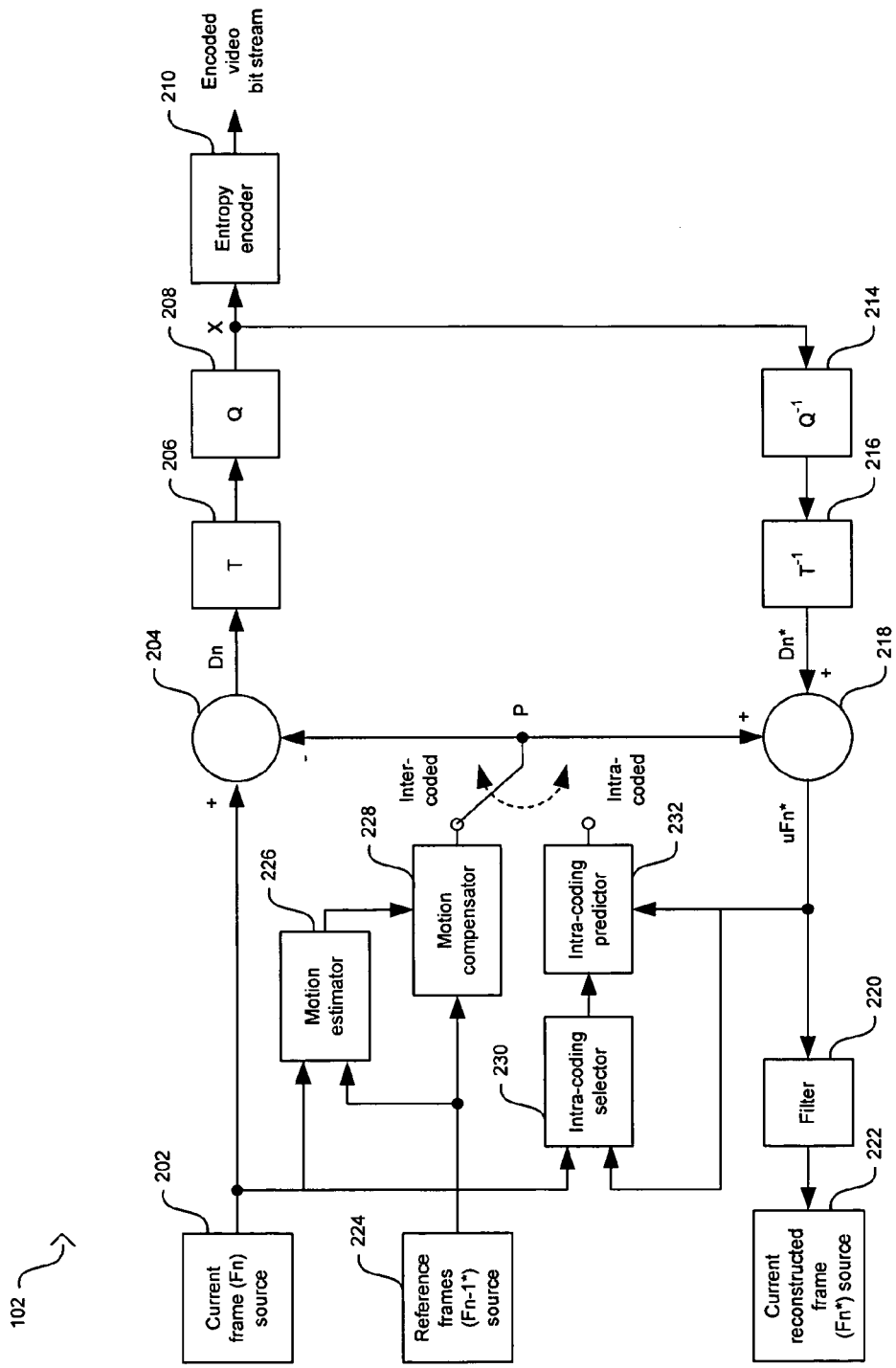
FIG. 2 is a block diagram of an exemplary H.264-based encoder, in connection with an embodiment of the invention.

FIG. 2 is a block diagram of an exemplary H.264-based encoder, in connection with an embodiment of the invention. Referring to FIG. 2, a video encoder 102 may be adapted to support, for example, fidelity range extensions (FRExt) and a high profile mode of operation associated with the H.264 standard specification. The video encoder 102 may comprise a current frame (Fn) source 202, a first digital adder 204, a forward transform (T) 206, a forward quantizer (Q) 208, an entropy encoder 210, a reference frames (Fn−1*) source 224, a motion estimator 226, a motion compensator 228, an intra-coding selector 230, and an intra-coding predictor 232, a reverse quantizer ($Q^{-1}$) 214, a reverse transform ($T^{-1}$) 216, a second digital adder 218, a digital filter 220, and a current reconstructed frame (Fn*) source 222.

During the encoding operation, the current frame source 202 may provide a current frame or picture in a GOP for encoding. The current picture may be processed in units of a macroblock, where a macroblock corresponds to, for example, 16×16 pixels in the original image. Each macroblock may be encoded in intra-coded mode, for "I" pictures, or in inter-coded mode, for "P" and "B" pictures. In either mode, a prediction macroblock P may be formed on a reconstructed frame or picture. In intra-coded mode, the intra-coding selector 230 may select between sample images from a current picture Fn and from pictures which have been previously encoded, decoded, and reconstructed as shown by the unfiltered reconstructed output uFn* of the second digital adder 218. The intra-coding predictor 232 may generate the predicted macroblock P based on the unfiltered reconstructed output uFn* and the selection made by the intra-coding selector 230. In inter-coded mode, the predicted macroblock P may be generated based on the current picture and motion-compensated prediction from one or more reference frames in the reference frame source 224. The motion compensated prediction may be provided by the motion estimator 226 and the motion compensator 228. The motion compensated prediction may be based on at least one previous encoded and reconstructed picture in time and/or at least one subsequent encoded and reconstructed picture in time from the current picture being encoded.

The predicted macroblock P may be subtracted from the current macroblock by the first digital adder 204 to generate a difference macroblock Dn. The difference macroblock may be transformed by the forward transform 206 and quantized by the forward quantizer 208. The output of the forward quantizer 208 may be entropy encoded by the entropy encoder 210 before being passed to the encoded video bit stream. The encoded video bit stream comprises the entropy-encoded video contents and any side information necessary to decode the macroblock.

During the reconstruction operation, the results from the forward quantizer 208 may be re-scaled and inverse transformed by the reverse quantizer 214 and the inverse transform 216 to generate a reconstructed difference macroblock Dn*. The prediction macroblock P may be added to the reconstructed difference macroblock Dn* by the second digital adder 218 to generate the unfiltered reconstructed output uFn*. The filter 220 may be applied to uFn* to reduce the effects of blocking distortion and a reconstructed reference frame or picture may be generated Fn*.

Figure 3A:
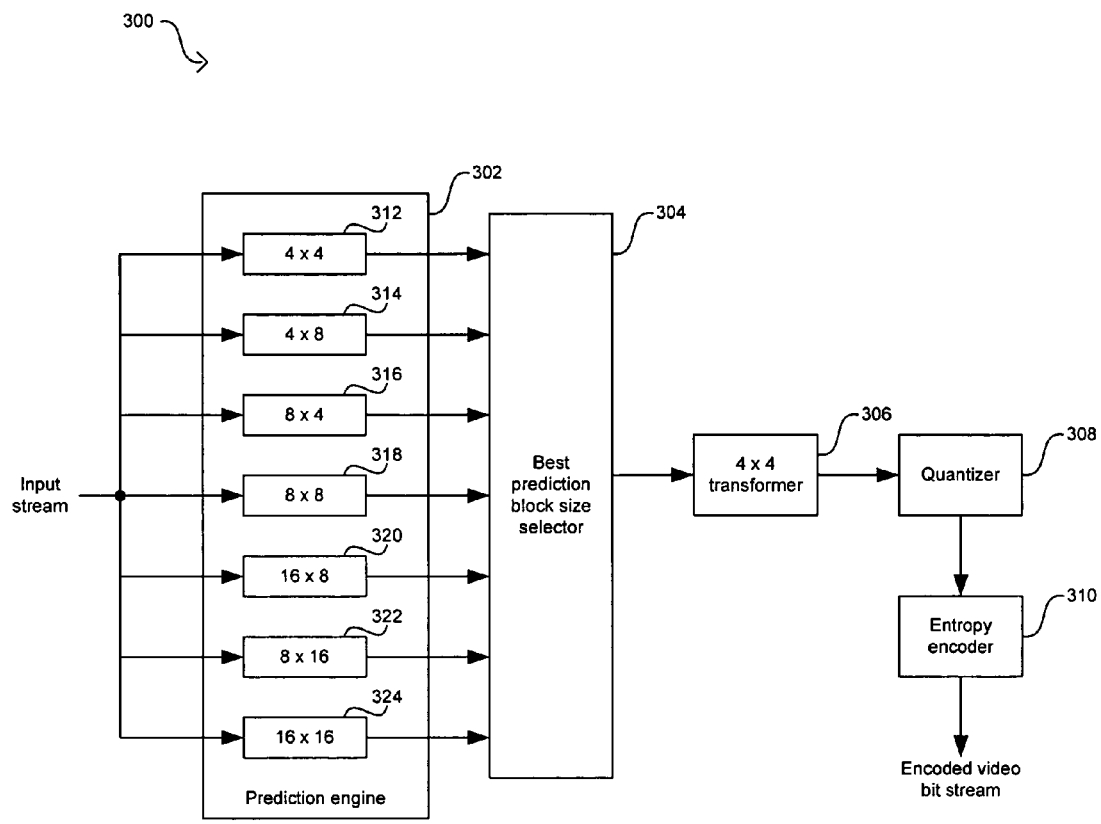
FIG. 3A is a block diagram of a portion of an exemplary H.264-based encoder with fixed transform size, in connection with an embodiment of the invention.

FIG. 3A is a block diagram of a portion of an exemplary H.264-based encoder with fixed transform size, in connection with an embodiment of the invention. Referring to FIG. 3A, the encoder 300 may be adapted to support, for example, fidelity range extensions (FRExt) and a high profile mode of operation associated with the H.264 standard specification. The video encoder 300 may comprise a prediction engine 302, a best prediction block size selector 304, a 4×4 transformer 306, a quantizer 308, and an entropy encoder 310. The prediction engine 302 may comprise a plurality of prediction size blocks 312 to 324. These prediction block sizes may be, for example, a 4×4 prediction block 312, a 4×8 prediction block 314, an 8×4 prediction block 316, an 8×8 prediction block 318, a 16×8 prediction block 320, an 8×16 prediction block 122, and/or a 16×16 prediction block 324.

The prediction engine 302 may comprise suitable logic, circuitry, and/or code that may be adapted to perform intra-prediction and inter-prediction of macroblocks. The prediction engine 302 may intra-predict or inter-predict portions or subblocks of a macroblock. When a block is encoded in intra mode, or intra-predicted or intra-coded, a prediction block P may be formed based on spatial prediction modes. In this regard, a block or prediction block may refer to a 16×16 macroblock or to an M×N macroblock subblock, where M≦16 and N≦16. The prediction block P may be subtracted from the current block to generate an error signal prior to encoding. The block contents may be luminance (luma) samples and/or may be chrominance (chroma) samples. There may be different spatial prediction modes for a specific block size based on the contents of the block. For example, an 8×8 chroma block may have 4 spatial prediction modes. The spatial prediction mode chosen for a block may be one that minimizes the residual between the prediction block P and the current block. The choice of intra prediction mode may be part of the side information that is signaled to the decoder.

Prediction based on motion compensation may be performed on a macroblock by dividing the macroblock into partitions and sub-partitions according to supported block sizes. When a block is encoded in inter mode, or inter-predicted or inter-coded, a prediction block P may be formed based on previously encoded and reconstructed blocks. A separate motion vector may be required for each partition and sub-partition of the predicted macroblock. Each motion vector and the structure of the partition and sub-partitions may be encoded and transmitted to a decoder for video reconstruction. For example, when large partitions or sub-partitions are chosen, a small number of bits may be necessary to signal to a decoder the motion vector and the partition size.

The best prediction block size selector 304 may comprise suitable logic, circuitry, and/or code that may be adapted to determine the best prediction block sizes to be used in predicting a macroblock. The best prediction block size selector 304 may be adapted to determine a set of best prediction block sizes for a macroblock based on which prediction block sizes minimize the residual between the prediction block P and the current block. Information regarding the set of best prediction block sizes may be encoded and transferred to a decoder for video reconstruction.

The 4×4 transformer 306 may comprise suitable logic, circuitry, and/or code that may be adapted to perform a forward transform on a predicted representation of a current macroblock that utilizes a 4×4 transform size. The 4×4 transformer 306 may be applied to both inter-predicted and intra-predicted images. The coefficients of the transform in the 4×4 transformer 306 may be selected to reduce redundancies in the signal's spatial content by compacting the signal's energy to as few basis functions as possible. For example, the transform coefficients may be programmable and there may be a different set of coefficients for intra-predicted images and for inter-predicted images. The quantizer 308 may comprise suitable logic, circuitry, and/or code that may be adapted to quantize or scale the transformed predicted image produced by the 4×4 transformer 306. The scaling coefficients of the quantizer 308 may be programmable and there may be a different set of coefficients for intra-predicted images and for inter-predicted images. The entropy encoder 310 may comprise suitable logic, circuitry, and/or code that may be adapted to encode the output of the quantizer 308 to generate an encoded video bit stream that may be transferred to at least one video decoder. The entropy encoder 310 may also encode additional side information that may be utilized by a decoder to reconstruct an image for display.

The video encoder 300 shown in FIG. 3A is limited to a 4×4 transform size in the 4×4 transformer 306. This size transform may reduce the artifacts that are generally associated with larger transforms but it may require that a large content of side information be transferred to a decoder to reconstruct the image.

Figure 3B:
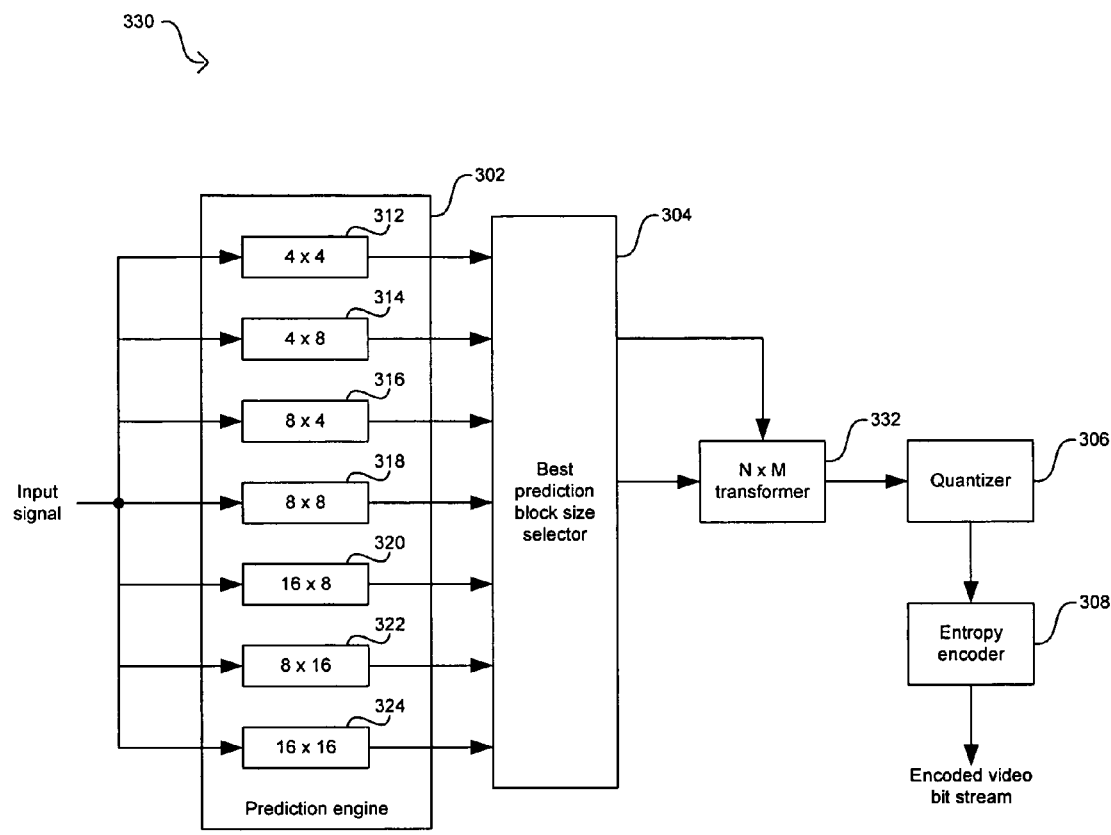
FIG. 3B is a block diagram of a portion of an exemplary H.264-based encoder where the transform size selection is tied to the best prediction block size, in connection with an embodiment of the invention.

FIG. 3B is a block diagram of a portion of an exemplary H.264-based encoder where transform block size selection is tied to the best prediction block size, in connection with an embodiment of the invention. Referring to FIG. 3B, the video encoder 330 differs from the video encoder 300 in FIG. 3A in that an N×M transformer 332 may replace the 4×4 transformer 306. The N×M transformer 332 may comprise suitable logic, circuitry, and/or code that may be adapted to forward transform a predicted macroblock with an N×M transform size. The N×M transform size may be selected to be of the same size as the best prediction block size of the predicted block being transformed. For example, when a macroblock is best predicted with an 8×8 prediction size, the N×M transformer 132 may utilize an 8×8 transform size. This approach may allow the use of larger transforms to improve compression efficiency but may result in the selection of large transform sizes for images with abrupt transitions. As with the 4×4 transformer 306 in FIG. 3A, the N×M transformer 332 may utilize different transform coefficients for inter-predicted and intra-predicted macroblocks.

Figure 3C:
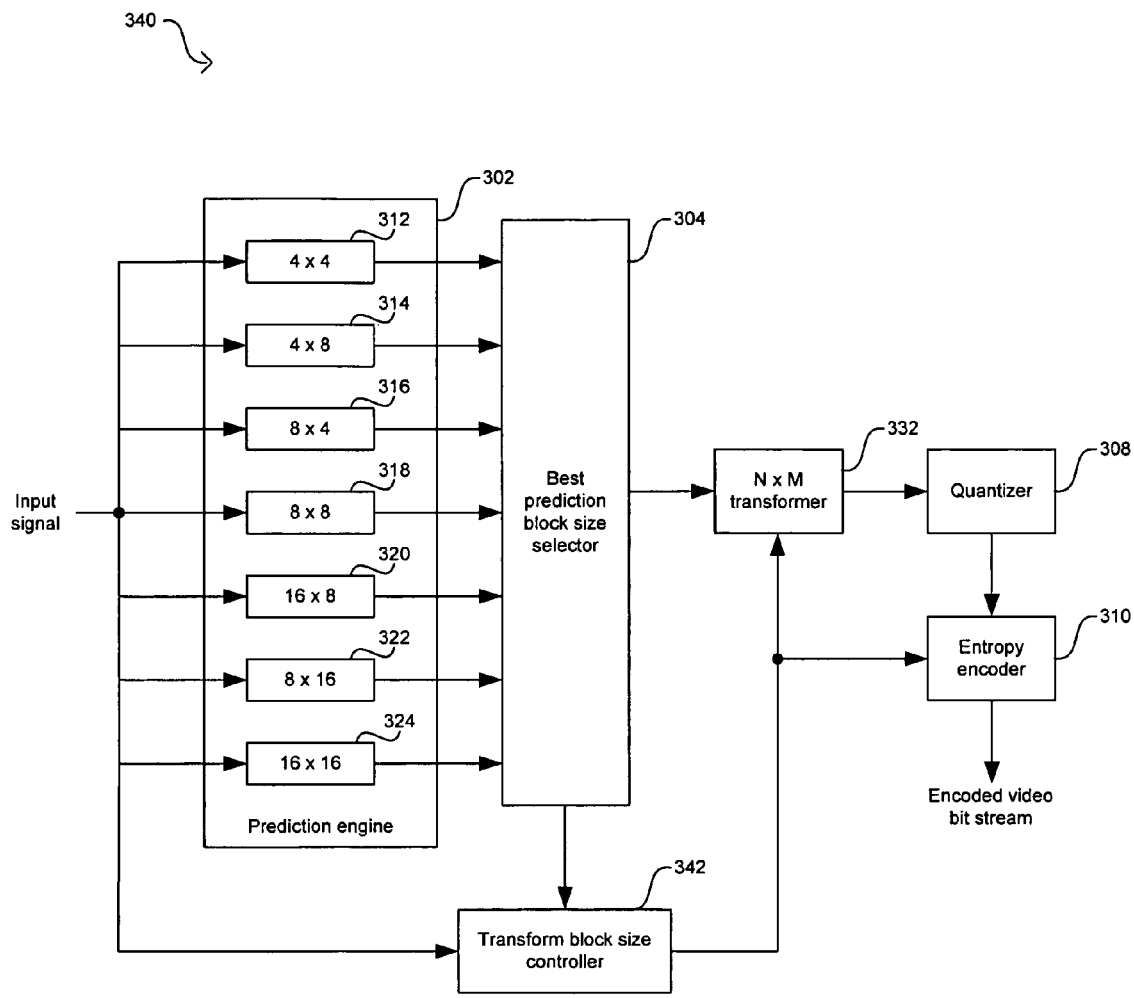
FIG. 3C is a block diagram of a portion of an exemplary H.264-based encoder where the transform size selection is based on image content and the best prediction block size, in accordance with an embodiment of the invention.

FIG. 3C is a block diagram of a portion of an exemplary H.264-based encoder where transform block size selection is based on image content and the best prediction block size, in accordance with an embodiment of the invention. Referring to FIG. 3C, the video encoder 340 may differ from the video encoder 330 in FIG. 3B in that a transform size controller 342 may be added to the system. The transform size controller 342 may comprise suitable logic, circuitry, and/or code that may be adapted to determine an N×M transform size to be utilized by the N×M transformer 332 for transforming inter-predicted and intra-predicted macroblocks.

The N×M transformer 332 may determine the N×M transform size based on a set of rules and/or guidelines that allow for the video encoder 340 to achieve the efficiency objectives of H.264. The transform size controller 342 may transfer information related to the transform size selection to the entropy encoder 310 for encoding. In this regard, the transform size controller 342 may generate, for example, a transform size syntax element that may comprise information regarding the transform size that may be utilized for reconstruction of the macroblock. The encoded information may then be transferred to decoders to decode and reconstruct the picture. The decoders may then make use of these guidelines and rules utilized by the video encoder 340 to inverse transform the predicted macroblocks with a reduced amount of side information.

Figure 3D:
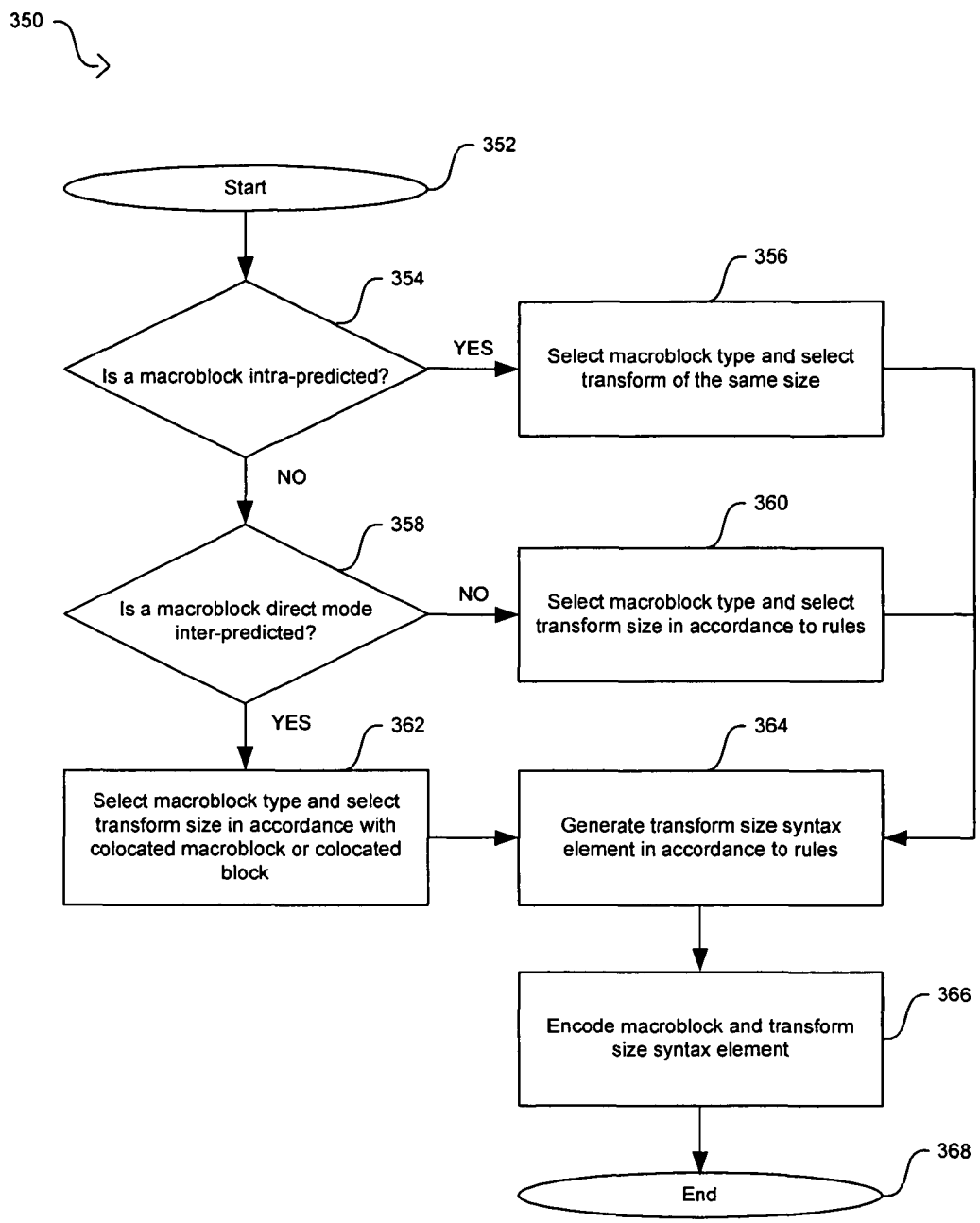
FIG. 3D is a flow diagram that illustrates exemplary steps for generating a transform size syntax element in an H.264-based video encoder, in accordance with an embodiment of the invention.

FIG. 3D is a flow diagram that illustrates exemplary steps for generating a transform size syntax element in an H.264-based video encoder, in accordance with an embodiment of the invention. Referring to FIG. 3D, after start step 352, in step 354, the video encoder 340 in FIG. 3C during a high profile mode of operation may determine whether the current macroblock is to be intra-predicted or inter-predicted. When the current macroblock is to be intra-predicted, the video encoder 340 may proceed to step 356 where a best prediction block size, that is, a macroblock type is selected for a current macroblock. When the macroblock type is a 4×4 macroblock type, the transform selected by the transform block size controller 342 in FIG. 3C is a 4×4 transform size. When the macroblock type is an 8×8 macroblock type, the transform size selected is an 8×8 transform size. After completing step 356, the video decoder 340 may proceed to step 364.

Returning to step 354, when the current macroblock is to be inter-predicted, the video decoder 340 may proceed to step 358. In step 358, the video decoder 340 may determine whether the current macroblock is to be direct mode inter-predicted, where direct mode refers to a mode of operation where a macroblock inherits a macroblock type from a col-located macroblock in a particular reference picture. When the current macroblock is not to be direct mode inter-predicted, that is, the current macroblock is to be inter-predicted, the video encoder 340 may proceed to step 360. In step 360, the best prediction block size selector 304 may select a macroblock type and the transform size controller 342 may select a corresponding transform size. In this regard, a rule may be that the transform size may be equal to or smaller than the inter-prediction block size. For example, when the macroblock type is an 8×16, a 16×8, or a 16×16 macroblock type, the transform size controller 342 may select a 4×4 transform size or an 8×8 transform size in accordance with the contents of the video signal. When the macroblock type is an 8×8 macroblock type, the transform size controller 342 may select a 4×4 transform size when the inter-predicted macroblock is subdivided. Moreover, the transform size controller 342 may select a 4×4 transform size or an 8×8 transform size when the inter-predicted macroblock is not subdivided. After completing step 360, the video decoder 340 may proceed to step 364.

Returning to step 358, when the current macroblock is to be direct mode inter-predicted the video encoder 340 may proceed to step 362. In step 362, direct mode inter-prediction may be specified at the macroblock level or at the 8×8 block level. When direct mode specified at the macroblock level, the prediction block size may be inherited from a corresponding collocated macroblock. In this regard, the macroblock type may be a 16×16, a 16×8, an 8×16, or an 8×8 with sub 8×8 partitioning macroblock type. When direct mode is specified at the 8×8 block level, the prediction block size may be inherited from a corresponding collocated 8×8 block. In this regard, the macroblock type may be an 8×8 with sub 8×8 partitionining macroblock type. When a direct mode signal, direct_8×8_inference_flag, is set, which may be set for standard definition (SD) resolutions and higher resolutions, the inherited prediction block size may be constrained to be 8×8 or larger and dynamic transform size selecting may be supported and a transform size syntax element, transform_size_8×8_flag, may be placed in the bitstream. When the direct_8×8_inference_flag is not set, since the prediction block sizes may be smaller than 8×8, only the 4×4 transform size may be allowed and the transform_size_8×8_flag is not placed in the bitstream.

In step 364, the transform size syntax element, transform_size_8×8_flag, may be generated in accordance with the results in steps 356, 360, or 362. For an inter-predicted macroblock where the selected macroblock type is an 8×8 macroblock type and the macroblock may be further subdivided, the transform size syntax element may not be transferred as part of the video stream to a video decoder. In step 366, the predicted and transformed macroblock and the generated transform size syntax element may be encoded and transferred to a video decoder via the encoded video bit stream. After completing step 366, the video encoder 340 may proceed to end step 368.

Figure 4:
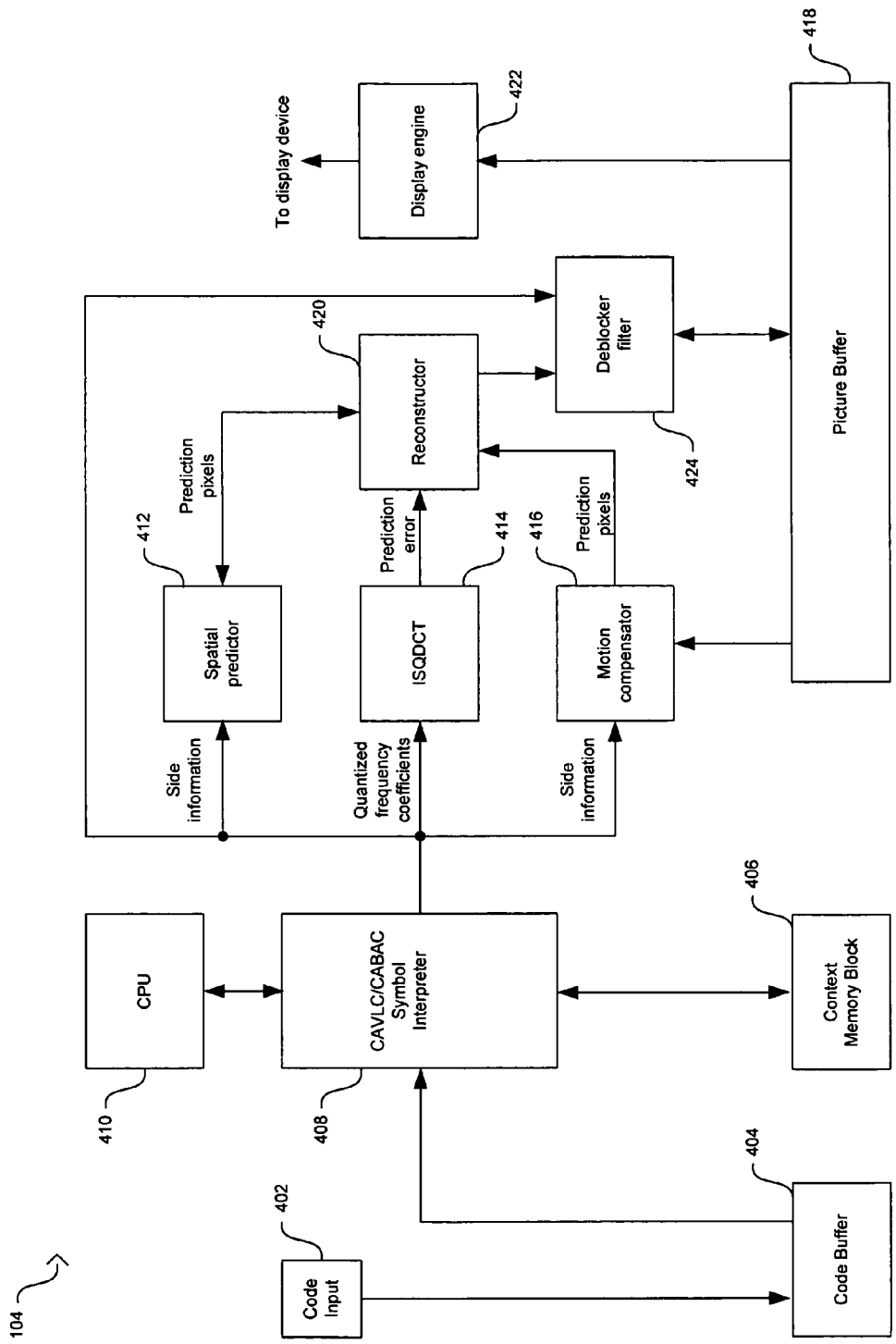
FIG. 4 is a flow diagram illustrating exemplary steps for inverse transform block size selection in an H.264-based decoder, in accordance with an embodiment of the invention.

FIG. 4 is a block diagram of an exemplary an H.264-based decoder, in accordance with an embodiment of the invention. Referring to FIG. 4, the video decoder 104 in FIG. 1 may comprise a code input 402, a code buffer 404, a symbol interpreter 408, a context memory block 406, a CPU 410, a spatial predictor 412, an inverse scanner, quantizer, and transformer (ISQDCT) 414, a motion compensator 416, a reconstructor 420, a deblocker filter 424, a picture buffer 418, and a display engine 422.

The code buffer 402 may comprise suitable circuitry, logic and/or code that may be adapted to receive and buffer a compressed video stream from the code input 402 prior to interpreting it by the symbol interpreter 408. The compressed video stream may be encoded in a binary format using CABAC or CAVLC, for example. Depending on the encoding method, the code buffer 404 may be adapted to transfer portions of different lengths of the compressed video stream as may be required by the symbol interpreter 408. The code buffer 404 may comprise a portion of a memory system, such as a dynamic random access memory (DRAM).

The symbol interpreter 408 may comprise suitable circuitry, logic and/or code that may be adapted to interpret the compressed video stream to obtain quantized frequency coefficients information and additional side information necessary for decoding of the compressed video stream. In this regard, the symbol interpreter 408 may be adapted to obtain the transform size syntax element generated by a video encoder and transmitted as part of the side information. The symbol interpreter 408 may also be adapted to interpret either CABAC or CAVLC encoded video stream, for example. In one aspect of the invention, the symbol interpreter 408 may comprise a CAVLC decoder and a CABAC decoder. Quantized frequency coefficients determined by the symbol interpreter 408 may be communicated to the ISQDCT 414, and the side information may be communicated to the motion compensator 416 and the spatial predictor 412.

The symbol interpreter 408 may also be adapted to provide the ISQDCT 414 with information regarding the forward transformation of the encoded macroblocks in the compressed video stream. In this regard, the symbol interpreter 408 may transfer to the ISQDCT 414 the decoded transform size syntax element. Depending on the prediction mode for each macroblock associated with an interpreted set of quantized frequency coefficients, the symbol interpreter 408 may provide side information either to a spatial predictor 412, if spatial prediction was used during encoding, or to a motion compensator 416, if temporal prediction was used during encoding. The side information may comprise prediction mode information and/or motion vector information, for example.

The symbol interpreter 408 may also provide side information to the deblocker filter 424. When the deblocker filter 424 is based on the normative deblocking filter specified by the H.264 standard, the side information may comprise prediction mode information, motion vector information, quantization parameter information, and/or boundary pixel values to determine the strength of the deblocking filter across, for example, 4×4 or 8×8 edge boundaries.

In order to increase processing efficiency, for example, a CPU 410 may be coupled to the symbol interpreter 408 to coordinate the interpreting process for each macroblock within the encoded video bit stream. In addition, the symbol interpreter 408 may be coupled to a context memory block 406. The context memory block 406 may be adapted to store a plurality of contexts that may be utilized for interpreting the CABAC and/or CAVLC-encoded bit stream. The context memory 406 may be another portion of the same memory system as the code buffer 404, or a portion of a different memory system, for example.

After interpreting the information from the code buffer 404 by the symbol interpreter 408, sets of quantized frequency coefficients may be communicated to the ISQDCT 414. The ISQDCT 414 may comprise suitable circuitry, logic and/or code that may be adapted to generate a prediction error from a set of quantized frequency coefficients received from the symbol interpreter 408. For example, the ISQDCT 414 may be adapted to transform the quantized frequency coefficients back to spatial domain using an inverse transform of a size that may be determined by the transform size syntax element. In this regard, the inverse transform size may be determined from the set or rules and guidelines used by the encoder to forward transform the macroblocks. After the prediction error is generated, it may be communicated to the reconstructor 420.

The spatial predictor 412 and the motion compensator 416 may comprise suitable circuitry, logic and/or code that may be adapted to generate prediction pixels utilizing side information received from the symbol interpreter 408. For example, the spatial predictor 412 may generate prediction pixels for spatially predicted macroblocks, while the motion compensator 416 may generate prediction pixels for temporally predicted macroblocks. The prediction pixels generated by the motion compensator 416 may comprise prediction pixels associated with motion compensation vectors in previously reconstructed pictures. The motion compensator 416 may retrieve the prediction pixels from previously reconstructed pictures stored in the picture buffer 418. The picture buffer 418 may store previously reconstructed pictures that may correspond to pictures that occurred before and/or after the current picture being processed.

The reconstructor 420 may comprise suitable circuitry, logic and/or code that may be adapted to receive the prediction error from the ISQDCT 414, as well as the prediction pixels from either the motion compensator 416 or the spatial predictor 412 based on whether the prediction mode was a temporal or spatial prediction, respectively. The reconstructor 420 may then generate a reconstructed output stream where reconstructed macroblocks in the reconstructed output stream make up a reconstructed picture. The reconstructed output stream may be generated based on the prediction error and the side information received from either the spatial predictor 412 or the motion compensator 416. The reconstructed output stream may then be transferred to the deblocker filter 424 for spatial filtering.

When the spatial predictor 412 is utilized for generating prediction pixels, reconstructed macroblocks may be communicated back from the reconstructor 420 to the spatial predictor 412. In this way, the spatial predictor 412 may utilize pixel information along a left, a corner or a top border with a neighboring macroblock to obtain pixel estimation within a current macroblock.

The deblocker filter 424 may comprise suitable circuitry, logic and/or code that may be adapted to spatially filter the reconstructed output stream received from the reconstructor 420 to reduce blocking artifacts. These blocking artifacts may be associated with missing pixel information along one or more borders between neighboring macroblocks and/or with spatial low frequency offsets between macroblocks.

The picture buffer 418 may be adapted to store one or more filtered reconstructed pictures in the filtered reconstructed output stream received from the deblocker filter 424. The picture buffer 418 may also be adapted to transfer filtered reconstructed pictures to the motion compensator 416. In addition, the picture buffer 418 may transfer a previously filtered reconstructed picture back to the deblocker filter 424 so that a current macroblock within a current picture may be spatially filtered to remove or reduce blocking artifacts. The picture buffer 418 may also transfer one or more filtered reconstructed pictures to the display engine 422. The display engine 422 may comprise suitable logic, circuitry, and/or code that may be adapted to output the filtered reconstructed output stream to a video display, for example.

The transform size syntax element generated by the video encoder 340, for example, and received by the video decoder 104 in FIG. 4 during a high profile mode of operation may be based on the observation that at standard definition (SD) resolution and above, the use of block sizes smaller than 8×8 is limited, and therefore new coding tools, a luma 8×8 transform and a luma 8×8 intra prediction mode may be utilized. In this regard, a transform mode, Transform8, may be utilized to indicate that an 8×8 transform may be in use or enabled for block sizes 8×8 and above. The mode may be enabled by the transform size syntax element, transform_8×8_mode_flag, in the Picture Parameter Set RBSP.

As a result, one or more of the following simplifications or conditions may be applied: transform sizes are not to be mixed within a macroblock; limit the larger transform size to 8×8, that is, do not use 8×4 and 4×8 transforms; limit the new intra modes to 8×8, that is, do not use 8×4 and 4×8 intra modes; allow an intra 16×16 mode when Transform8 is enabled; limit the use of the Transform8 mode to when the syntax element level×10 is greater than or equal to 40, that is, level >=3, since at these levels the syntax element direct_8×8_inference_flag is equal to logic 1 ensuring that direct mode vectors are never applied to smaller than 8×8 blocks; limit the use of the Transform8 mode to when the syntax element profile is equal to the Professional Extensions; and limit the use of the Transform8 mode to when the syntax element entropy_coding_mode_flag is equal to logic 1, that is, CABAC is enabled in, for example, the symbol interpreter 408 in FIG. 4.

In addition to the transform size syntax element, additional syntax elements may be utilized. For macroblock types P_8×8 and B_8×8, the syntax element all_8×8 equal to logic 1 may be used to indicate that all four 8×8 subpartitions are using 8×8 block size. In this case, the 8×8 transform size is used. Otherwise, when all_8×8 is equal to logic 0, block sizes smaller than 8×8 may be in use and so the existing 4×4 transform size is used. For the syntax element mb_type is equal to logic 0, the syntax element intra_pred_size may be used to indicate whether the macroblock type is Intra_4×4, that is, the syntax element intra_pred_size is equal to logic 0, or Intra_8×8. When the macroblock type is Intra_8×8, the syntax elements prev_intra8×8_pred_mode_flag and rem_intra8×8_pred_mode may be used to determine the specific 8×8 intra mode used.

TABLE 1

Luma transform size.

| Macroblock Type | transform_8 × 8_mode_flag | all_8 × 8 | Luma Transform Size |
|---|---|---|---|
| Intra_4 × 4 | na | na | 4 × 4 |
| Intra_8 × 8 | na | na | 8 × 8 |
| Intra_16 × 16 | na | na | 4 × 4 |
| P_16 × 16 | 0 | na | 4 × 4 |
|  | 1 | na | 8 × 8 |
| P_8 × 16 | 0 | na | 4 × 4 |
|  | 1 | na | 8 × 8 |
| P_16 × 8 | 0 | na | 4 × 4 |
|  | 1 | na | 8 × 8 |
| P_8 × 8 | 0 | na | 4 × 4 |
|  | 1 | 0 | 4 × 4 |
|  | 1 | 1 | 8 × 8 |
| B_Direct | 0 | na | 4 × 4 |
|  | 1 | na | 8 × 8 |
| B_16 × 16 | 0 | na | 4 × 4 |
|  | 1 | na | 8 × 8 |
| B_16 × 8 | 0 | na | 4 × 4 |
|  | 1 | na | 8 × 8 |
| B_8 × 16 | 0 | na | 4 × 4 |
|  | 1 | na | 8 × 8 |
| B_8 × 8 | 0 | na | 4 × 4 |
|  | 1 | 0 | 4 × 4 |
|  | 1 | 1 | 8 × 8 |

Table 1 indicates an exemplary mapping of macroblock type to luma transform size that results from the addition of the new syntax elements to the encoding and decoding operations in H.264 standard specifications. For example, Table 1 comprises intra-coded macroblock types Intra_4×4, Intra_8×8, and Intra_16×16, inter-coded macrocroblock types P_16×16, P_8×16, P_16×8, P_8×8, B_16×16, B_8×16, B_16×8, B_8×8, B_direct, where B_direct corresponds to a macroblock in a "B" slice that is in direct mode with a collocated macroblock in a particular reference picture.

Figure 5:
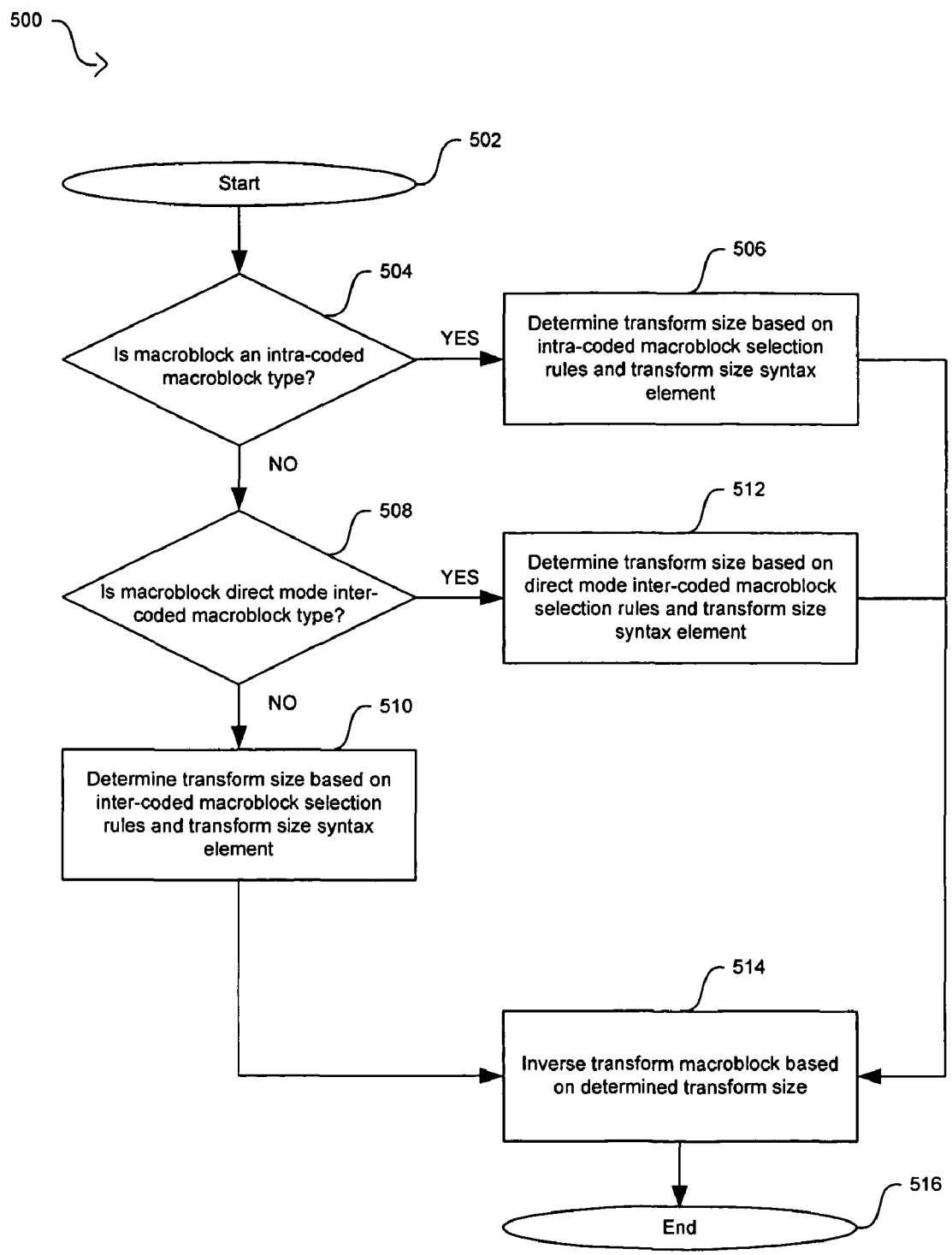
FIG. 5 is a flow diagram illustrating exemplary steps for inverse transform block size selection in an H.264-based video decoder based on a transform size syntax element, in accordance with an embodiment of the invention.

FIG. 5 is a flow diagram illustrating exemplary steps for inverse transform block size selection in an H.264-based video decoder based on a transform size syntax element, in accordance with an embodiment of the invention. Referring to FIG. 5, after start step 502, in step 504, the video decoder 104 in FIG. 1 may determine whether the current decoded macroblock is an intra-coded macroblock. When the macroblock is intra-coded, the video encoder 104 may proceed to step 506 to determine the transform size. In step 506, the high profile mode and the 8×8 transform in the video decoder 104 may be enabled. The decoding of a macroblock type to I_4×4 may be changed semantically to mean I_N×N. When the macroblock type is decoded to mean I_N×N, the transform_size_8×8_flag syntax element may indicate whether N×N corresponds to a 4×4 transform size or to an 8×8 transform size. When the transform_size_8×8_flag syntax element indicates an 8×8 transform size, then an 8×8 spatial prediction and an 8×8 transform are used. Otherwise, an 4×4 spatial prediction and a 4×4 transform are used. The approach described for intra-coded macroblocks allows the support of an 8×8 spatial prediction mode without the need to cause many VLC tables or CABAC context tables. After determining the inverse transform size, the flow diagram 500 may proceed to step 514.

Returning to step 504, when the macroblock is not an intra-coded macroblock, the video decoder 104 may proceed to step 508. In step 508, the video decoder 104 may determine whether the macroblock is a direct mode inter-coded macroblock. When the macroblock is a not a direct mode macroblock, the video decoder 104 may proceed to step 510. In step 510, when the macroblock type was 8×16, 16×8, or 16×16, then the transform size could be either a 4×4 transform size or an 8×8 transform and that the transform size may be indicated using the transform_size_8×8_flag syntax element, that is, the transform_size_8×8_flag syntax element may indicate whether the 4×4 transform size or the 8×8 transform size is to be used. When the macroblock type is 8×8, then the video decoder 104 determines whether any of the 8×8 blocks were subdivided. If the blocks were to, for example, 4×4, 4×8, or 8×4, then only the 4×4 transform size may be used and the transform_size_8×8_flag syntax element may not need to be in the encoded video bit stream. When none of the 8×8 blocks were subdivided, then the transform_size_8×8_flag syntax element is in the encoded video bit stream to indicate whether the 4×4 transform size or the 8×8 transform size is to be used. After determining the inverse transform size, the flow diagram 500 may proceed to step 514.

Returning to step 508, when the macroblock is a direct mode macroblock, the video decoder 104 may proceed to step 512. In step 512, when the inter-coded macroblocks are part of a "B" slice, the whole macroblock may be direct mode, B_Direct_16×16, or an individual 8×8 block can be direct mode, B_Direct_8×8. In either case, the macroblock or the block may inherit the block size of the collocated macroblock or the collocated block in a particular reference picture. The collocated block size may not be known during stream parsing. In this regard, the video decoder 104 may use the 4×4 transform size when an inherited 8×8 block size may be further subdivided. Because for standard definition (SD) resolutions and above the inherited block may generally be 8×8 or larger, which may be indicated by a direct_8×8_inference flag syntax element being set to logic 1 for SD and higher resolution, and the transform_size_8×8_flag syntax element is in the encoded video bit stream and may be utilized to determine whether the 4×4 transform size or the 8×8 transform size is to be used. After determining the inverse transform size, the flow diagram 500 may proceed to step 514.

In step 514, the video decoder 104 in FIG. 1 may inverse transform the received macroblock based on the selected inverse transform size in either steps 506, 510, or 512. After completing step 514, the video decoder 104 may proceed to end step 516.

These selection rules and guidelines, and the syntax elements presented herein for the high profile mode in the H.264 standard specification may combine the benefits of reduced residual correlation through better signal prediction selection with the benefits of large transform sizes in areas without high detail and/or sharp transitions.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
   inter-predicting a macroblock with an encoder;
   selecting a macroblock type based on said inter-predicting;
   selecting a transform size based on said selected macroblock type, wherein said transform size is selected from a 4×4 transform size or an 8×8 transform size; and
   generating a transform size syntax element based on said selected transform size to indicate to a video decoder an inverse transform size to use with said inter-predicted macroblock wherein the transform size syntax element comprises a transform mode element indicating whether a transform mode is 8×8; and
   wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

2. The method according to claim 1, wherein said selected macroblock type is an 8×16 macroblock type.

3. The method according to claim 1, wherein said selected macroblock type is a 16×8 macroblock type.

4. The method according to claim 1, said selected macroblock type is a 16×16 macroblock type.

5. The method of claim 1, wherein inter-predicting the macroblock further comprises selecting a block size for motion estimation, wherein the block size for motion estimation is different from the transform size.

6. A method for video signal processing, the method comprising: inter-predicting a macroblock with an encoder; selecting an 8×8 macroblock type based on said inter-predicting; selecting a transform size based on said selected macroblock type, wherein said transform size is selected from a 4×4 transform size or an 8×8 transform size; and generating a transform size syntax element based on said selected transform size to indicate to a video decoder an inverse transform size to use with said inter-predicted macroblock; and wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

7. The method of claim 6, wherein inter-predicting the macroblock further comprises selecting a block size for motion estimation, wherein the block size for motion estimation is different from the transform size.

8. A method for video signal processing, the method comprising: inter-predicting a macroblock in direct mode with an encoder; selecting a macroblock type based on said inter-predicting; selecting an 8×8 transform size for said direct mode inter-predicted macroblock when a collocated macroblock is an 8×8 macroblock type or a larger size macroblock type; and generating a transform size syntax element based on said selected 8×8 transform size to indicate to a video decoder an inverse transform size to use with said inter-predicted macroblock; and wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

9. A system for video signal processing, the system comprising: at least one circuitry that inter-predicts a macroblock and selects a macroblock type based on said inter-prediction; said at least one circuitry selects a transform size based on said selected macroblock type, wherein said transform size is selected from a 4×4 transform size or said at least one circuitry generates a transform size syntax element based on said selected transform size to indicate to a video decoder an inverse transform size to use with said inter-predicted macroblock; and wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

10. The system according to claim 9, wherein said selected macroblock type is an 8×16 macroblock type.

11. The system according to claim 9, wherein said selected macroblock type is a 16×8 macroblock type.

12. The system according to claim 9, said selected macroblock type is a 16×16 macroblock type.

13. The system of claim 9, wherein inter-predicting the macroblock further comprises selecting a block size for motion estimation, wherein the block size for motion estimation is different from the transform size.

14. A system for video signal processing, the system comprising: at least one circuitry that inter-predicts a macroblock and selects an 8×8 macroblock type based on said inter-prediction; said at least one circuitry selects a transform size based on said selected macroblock type, wherein said transform size is selected from a 4×4 transform size or an 8×8 transform size; and said at least one circuitry generates a transform size syntax element based on said selected transform size to indicate to a video decoder an inverse transform size to use with said inter-predicted macroblock; and wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

15. A system for video signal processing, the system comprising: at least one circuitry that inter-predicts a macroblock in direct mode and selects a macroblock type based on said inter-prediction operation; said at least one circuitry selects an 8×8 transform size for said direct mode inter-predicted macroblock when a collocated macroblock is an 8×8 macroblock type or a larger size macroblock type; and said at least one circuitry generates a transform size syntax element based on said selected 8×8 transform size to indicate to a video decoder an inverse transform size to use with said inter-predicted macroblock; and wherein the transform size syntax element comprises an element indicating whether all of the macroblock is 8×8 and wherein if either the transform mode element indicating whether a transform mode is 8×8 or the element indicating whether all of the macroblock is 8×8 are not set, the transform size is 4×4.

\* \* \* \* \*

UNITED STATES PATENT AND TRADEMARK OFFICE
CERTIFICATE OF CORRECTION

| | | |
|---|---|---|
| PATENT NO. | : 8,116,374 B2 | Page 1 of 1 |
| APPLICATION NO. | : 11/119615 | |
| DATED | : February 7, 2012 | |
| INVENTOR(S) | : Gordon et al. | |

It is certified that error appears in the above-identified patent and that said Letters Patent is hereby corrected as shown below:

Column 15, line 14, please remove "are" and replace it with "is".

Column 15, line 32, please remove "are" and replace it with "is".

Column 16, line 2, please remove "are" and replace it with "is".

Column 16, line 28, please remove "are" and replace it with "is".

Column 16, line 43, please remove "are" and replace it with "is".

Signed and Sealed this
Twenty-fourth Day of April, 2012

David J. Kappos
*Director of the United States Patent and Trademark Office*